F. J. STULP.
HOSE AND PIPE MENDER.
APPLICATION FILED JULY 22, 1909.
969,919.
Patented Sept. 13, 1910.
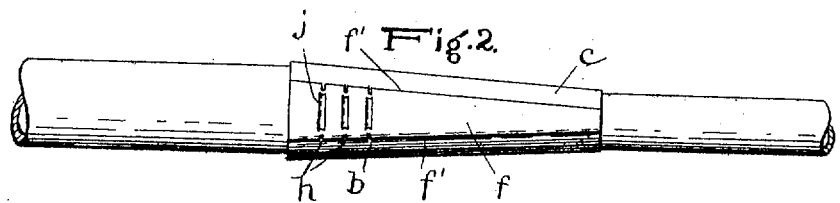
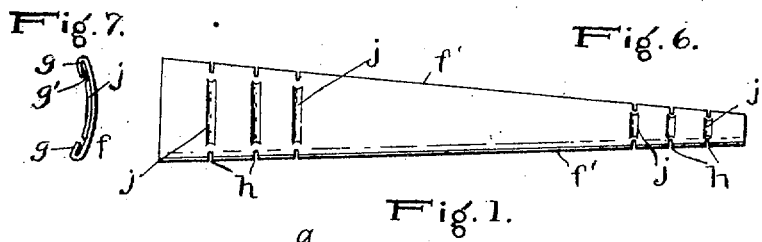
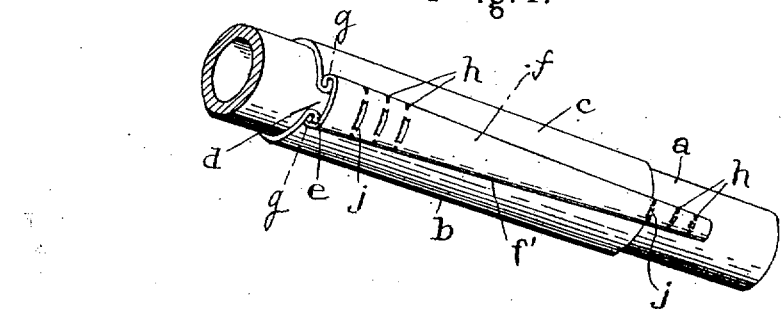
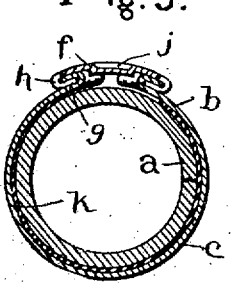
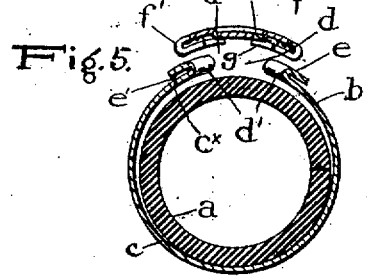
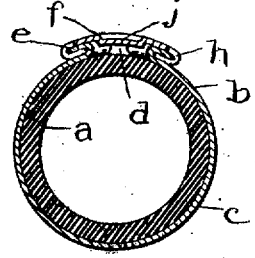
Witnesses
Inventor
Fred. J. Stulp
by E. W. Anderson
his Attorneys

UNITED STATES PATENT OFFICE.

FRED J. STULP, OF MUSKEGON, MICHIGAN.

HOSE AND PIPE MENDER.

969,919. Specification of Letters Patent. Patented Sept. 13, 1910.

Application filed July 22, 1909. Serial No. 509,059.

*To all whom it may concern:*

Be it known that I, FRED J. STULP, a citizen of the United States, resident of Muskegon, in the county of Muskegon and State of Michigan, have made a certain new and useful Invention in Hose and Pipe Menders; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention relates to means for mending or patching rubber hose or metal piping, also applicable as a pipe joint; and it consists in the novel construction and combinations of parts, as hereinafter set forth.

In the accompanying drawings, illustrating the invention, Figure 1 is a perspective view of the invention as applied; Fig. 2 is a side view of the invention applied as a pipe joint to connect pipes of unequal diameters; Fig. 3 is a cross section of the invention as applied to metal piping showing a rubber washer; Fig. 4 is a similar view of the invention as applied to rubber hose; Fig. 5 is a similar view with the sections detached from each other; Fig. 6 is a detail plan view of the tightener section, and Fig. 7 is an end view of the same.

In these drawings, the letter $a$ designates a section of flexible hose or other piping, and $b$ is the mender forming my invention and designed primarily to stop a leak in said piping. This device consists of a body $b$ of the form of the major portion of a hollow cylinder, composed of flexible metal and having at one side thereof a longitudinal slot or opening $d$ extending from end to end of said body and having tapered or converging edge walls $d'$, $d'$, provided each with a narrow outturned flange $e$, substantially parallel with the part $c^x$ of the body wall adjacent thereto and separated from such part of the body wall by a narrow interval $e'$ open at one side and both ends. This tapered longitudinal slot $d$ is at its widest end preferably about forty five degrees in width or about one half of a quadrant.

$f$ is the tightener section of the invention, which is also of tapered form, forming the complement of the hollow cylinder of which the part $c$ is the major portion, and having its edge walls $f'$, $f'$, parallel to but arranged more closely together than the edge walls of the slot of said body in its expanded state or before the tightener section is applied thereto. This tightener section is provided with narrow inturned edge flanges $g$, $g$, substantially parallel to and located beneath the adjacent edge walls of said section and separated therefrom by a narrow interval $g'$, also open at one side and both ends. This tightener section is of greater length than that of the body $c$, and has at one or both end portions there of a series of opposite edge slits $h$, $h$, and intermediate alined depressions $j$, $j$, formed therein. In this way the walls of the body $c$ may be drawn together to a greater or less degree to fit pipes of different sizes or diameters in mending a leak therein, according to the extent of inward movement of the tightener section in engaging the body flanges. The unused portion of the tightener section is broken off along the proper line of slits and depression, and thrown away. When the flanges of the tightener section are engaged with the flanges of the body section, the tapered walls of the slot of such body will be powerfully drawn together, at the same time drawing together the body walls proper to tightly clasp the hose or pipe and securely close the leak therein.

In case metal piping is to be mended, a washer $k$ is employed between the mending device and the pipe wherein the leak is located, as shown in Fig. 3 of the drawings. When a tapered joint is desired for piping of different diameters, the body $c$ may be made of the desired taper and the tapered longitudinal slot and tapered tightener section provided for as before stated, as shown in Fig. 2. Or the tightener section of the invention may be reversed end for end in its application, which will effect the desired tapered formation of the body section. In order to effectually close the leak in the pipe it is essential that the walls of the body $c$ be tightly drawn together and for this reason it is important that said body walls be of elastic nature. In the present case the elasticity of the body walls is preserved, a comparatively narrow slot being cut therein.

Having thus described my invention, what I claim as new and desire to secure by Letters Patent is:

1. A device for the purpose described, comprising a body section of the form approximately of the major part of a hollow body of circular cross-section, provided with a longitudinal slot open at both ends, and having tapered edge walls provided with narrow substantially plane flange-extensions, and a tightening section of comparatively narrow character of greater length than said body and having tapered edge walls provided with narrow substantially plane flange-extensions capable of engagement with the flange extensions of the body section, said tightening section having alined slits and depressions for easy and smooth fracture.

2. A tightening section for the purpose described, having tapered edge walls provided with narrow substantially plane flange-extensions substantially parallel to the adjacent portions of the wall of the tightening section and having alined slits and depressions for easy and smooth fracture.

In testimony whereof I affix my signature, in presence of two witnesses.

FRED J. STULP.

Witnesses:
ALTA REED,
FRANK D. SMITH.